(12) United States Patent
Tsukamoto et al.

(10) Patent No.: US 12,495,216 B2
(45) Date of Patent: Dec. 9, 2025

(54) ELECTRONIC APPARATUS AND IMAGE PROCESSING METHOD

(71) Applicant: Lenovo (Singapore) Pte. Ltd., Singapore (SG)

(72) Inventors: Yasushi Tsukamoto, Kanagawa (JP); Koji Kawakita, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 79 days.

(21) Appl. No.: 18/626,682

(22) Filed: Apr. 4, 2024

(65) Prior Publication Data

US 2024/0414446 A1    Dec. 12, 2024

(30) Foreign Application Priority Data

Jun. 9, 2023    (JP) .................................. 2023-095554

(51) Int. Cl.
*H04N 23/76*    (2023.01)
*G06T 5/50*    (2006.01)
*G06T 5/60*    (2024.01)
*H04N 23/71*    (2023.01)

(52) U.S. Cl.
CPC ............... *H04N 23/76* (2023.01); *G06T 5/50* (2013.01); *G06T 5/60* (2024.01); *H04N 23/71* (2023.01); *G06T 2207/20081* (2013.01); *G06T 2207/20212* (2013.01)

(58) Field of Classification Search
None
See application file for complete search history.

(56) References Cited

U.S. PATENT DOCUMENTS

| | | | |
|---|---|---|---|
| 2019/0228510 A1* | 7/2019 | Hwang | G06T 5/60 |
| 2021/0152735 A1* | 5/2021 | Zhou | G06T 5/73 |
| 2022/0270225 A1 | 8/2022 | Pham et al. | |
| 2022/0318971 A1 | 10/2022 | Choi et al. | |
| 2022/0353401 A1* | 11/2022 | Do | H04N 23/687 |
| 2022/0394175 A1 | 12/2022 | Kim et al. | |
| 2023/0028315 A1 | 1/2023 | Shukla et al. | |
| 2023/0040122 A1 | 2/2023 | Park et al. | |
| 2023/0081302 A1 | 3/2023 | Kwon et al. | |
| 2023/0319423 A1 | 10/2023 | Yu et al. | |

FOREIGN PATENT DOCUMENTS

JP    2022-513506 A    2/2022

* cited by examiner

*Primary Examiner* — James M Hannett
(74) *Attorney, Agent, or Firm* — Osha Bergman Watanabe & Burton LLP

(57) ABSTRACT

An electronic apparatus includes: a display in which a plurality of pixels are arranged; a camera; and a controller. Light transmitted through a part of an area of the display is incident on the camera. The controller is configured to determine a high-brightness area in which a brightness exceeds a certain value, based on a brightness distribution of a captured image captured by the camera, determine an artifact distribution based on an artifact pattern for a point light source and the high-brightness area, estimate a correction image based on the captured image by using a machine learning model that has learned a relationship between a first image captured with transmission through the display and a second image captured without transmission through the display, determine an applied intensity of the correction image based on the artifact distribution, and combine the correction image and the captured image based on the applied intensity.

6 Claims, 13 Drawing Sheets

ELECTRONIC APPARATUS AND IMAGE PROCESSING METHOD

CROSS-REFERENCE TO RELATED APPLICATIONS

This application claims priority to Japanese Patent Application No. 2023-095554 filed on Jun. 9, 2023, the contents of which are hereby incorporated herein by reference in their entirety.

TECHNICAL FIELD

The present application relates to an electronic apparatus and an image processing method, for example, an electronic apparatus including a display and a camera.

BACKGROUND

An electronic apparatus, such as a clamshell personal computers (PCs), includes a display and a camera in a chassis. In order to prevent the screen display from being hindered as much as possible, the camera may be provided around a screen area of the display and may be supported by a bezel. In addition, in an electronic apparatus having a relatively small screen area, an imaging area may be installed inside the screen area, and an imaging unit may be provided on a back surface of the imaging area. The camera is installed to avoid the screen area, so that a screen occupancy rate is limited.

In recent years, in response to a demand for an apparatus having a high screen occupancy rate, an electronic apparatus adopting a camera under display (CUD) method has been proposed. The CUD method has a configuration in which the camera is installed on the back surface of the imaging area constituting a part of the screen area. The camera captures an image appearing in light transmitted through the imaging area. For example, Japanese Unexamined Patent Application Publication (Translation of PCT Application) No. 2022-513506 describes a display device in which a device main body is covered with a display panel, an element area is located behind a display area, and a photosensitive element that collects light through the display area is included in the element area. The photosensitive element includes a camera.

In the CUD method, in a case in which the image is captured, pixels disposed in the imaging area are turned off. A corresponding portion of incident light from an object is reflected on a surface of the pixel disposed on a display panel and is diffracted at an outer edge of the pixel. The reflection and diffraction can be a main cause of an artifact that is likely to occur around an image of a light source. This artifact is not eliminated by general image processing, such as color conversion, noise removal, super-resolution, sharpening, and gloss removal. In this regard, it is conceivable to remove the artifact that occurs in the captured image by using an artificial intelligence (AI) model that has learned a relationship between a target image captured without transmission through the display and the captured image captured with transmission through the display.

Meanwhile, the estimation accuracy is likely to deteriorate for an estimation image estimated from the captured image of which the relationship with the target image is not known. For example, in the estimation image, an artifact that cannot occur in the target image may occur, or a luminance distribution of the object other than the light source may significantly vary. On the other hand, in a commercial electronic apparatus in which the display is incorporated, it is not realistic to acquire the captured image and the target image corresponding to the captured image by attaching and detaching the display. In other words, since there is a difference in imaging conditions between the captured image and the target image, other than the presence or absence of the display, the difference cannot be explained by the AI model. For example, in a case in which the same field of view is imaged by using separate cameras, a luminance or hue distribution of the captured image may vary depending on the viewpoints between the cameras or the properties of the members.

SUMMARY

One or more embodiments of the present application relates to an electronic apparatus including: a display in which a plurality of pixels are arranged; a camera; and a controller, in which light transmitted through a part of an area of the display is incident on the camera, and the controller is configured to determine a high-brightness area in which a brightness exceeds a certain value, based on a brightness distribution of a captured image captured by the camera, determine an artifact distribution based on an artifact pattern for a point light source and the high-brightness area, estimate a correction image based on the captured image by using a machine learning model that has learned a relationship between a first image captured with transmission through the display and a second image captured without transmission through the display, determine an applied intensity of the correction image based on the artifact distribution, and combine the correction image and the captured image based on the applied intensity.

In the electronic apparatus according to one or more embodiments, the controller may be configured to determine a specific area representing a specific object from the captured image, and apply the captured image in the specific area without applying the correction image.

In the electronic apparatus according to one or more embodiments, the controller may be configured to determine the artifact pattern depending on an imaging parameter of the camera.

In the electronic apparatus according to one or more embodiments, the imaging parameter may include a parameter related to exposure of the camera.

In the electronic apparatus according to one or more embodiments, the camera may be installed on a back surface of a display surface of the display.

One or more embodiments of the present application relates to an image processing method of an electronic apparatus including a display in which a plurality of pixels are arranged, and a camera, in which light transmitted through a part of an area of the display is incident on the camera, the image processing method including: via the electronic apparatus, determining a high-brightness area in which a brightness exceeds a certain value, based on a brightness distribution of a captured image captured by the camera; determining an artifact distribution based on an artifact pattern for a point light source and the high-brightness area; estimating a correction image based on the captured image by using a machine learning model that has learned a relationship between a first image captured with transmission through the display and a second image captured without transmission through the display; determining an applied intensity of the correction image based on the artifact distribution; and combining the correction image and the captured image based on the applied intensity.

One or more of the above-described embodiments can remove the artifact while suppressing the deterioration of the image quality.

DETAILED DESCRIPTION OF THE INVENTION

Figure 1:
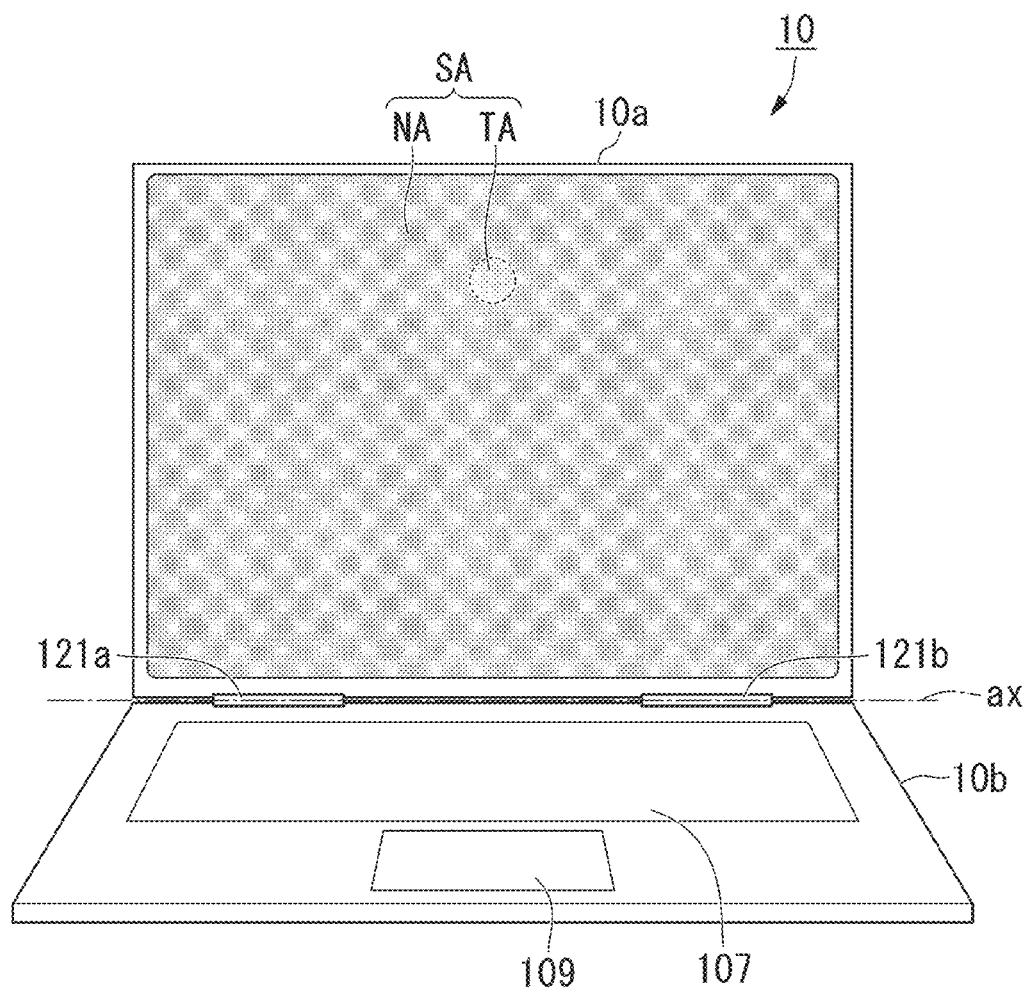
FIG. 1 is a front view illustrating an external configuration example of an information processing apparatus according to the present embodiment.
Figure 2:
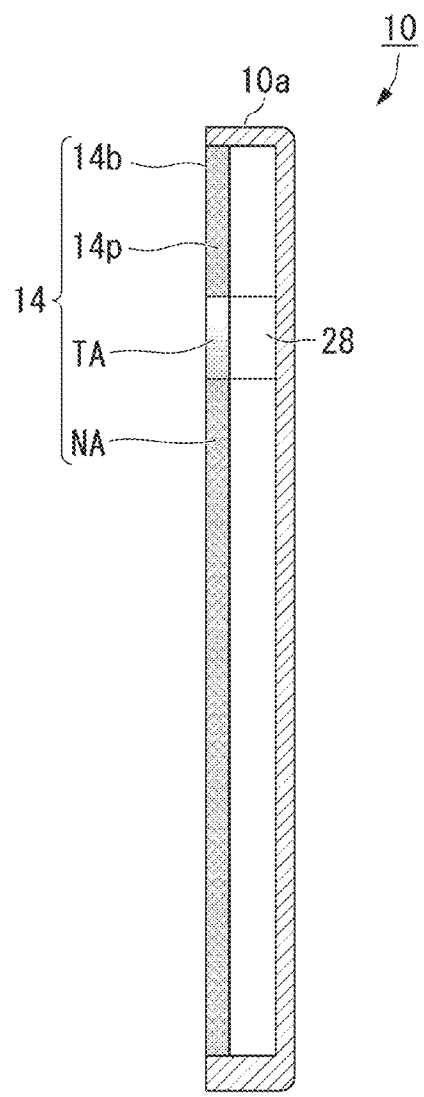
FIG. 2 is a cross-sectional view illustrating a cross section of the information processing apparatus according to the present embodiment.

Hereinafter, an electronic apparatus according to one or more embodiments of the present application will be described with reference to the accompanying drawings. In the following description, as an example, a case will be described in which the electronic apparatus according to the one or more embodiments is an information processing apparatus 10 configured as a clamshell PC. FIG. 1 is a front view illustrating an external configuration example of an information processing apparatus 10 according to one or more embodiments. FIG. 2 is a cross-sectional view illustrating a cross section of the information processing apparatus 10 according to one or more embodiments.

The information processing apparatus 10 includes a first chassis 10a and a second chassis 10b. The first chassis 10a is rotationally movable with respect to the second chassis 10b, and an angle (referred to as an "opening/closing angle" in the present application) between a surface of the first chassis 10a and a surface of the second chassis 10b is variable. A long side of the first chassis 10a and a long side of the second chassis 10b are joined to each other by using hinge mechanisms 121a and 121b. The hinge mechanisms 121a and 121b allow the first chassis 10a to be relatively rotationally movable with respect to the second chassis 10b about a rotation axis ax. A direction of the rotation axis ax is parallel to either the long side of the first chassis 10a or the long side of the second chassis 10b. The hinge mechanisms 121a and 121b can maintain any opening/closing angle θ even in a case in which a certain torque is applied.

An inside of the first chassis 10a is formed in a box shape, and a display 14 and a camera 28 are mounted in the first chassis 10a. The other members are stored inside the second chassis 10b. In addition, a keyboard 107 and a touch pad 109 are mounted on the surface of the second chassis 10b. In a state in which the first chassis 10a is opened with respect to the second chassis 10b, a user facing a front surface of the first chassis 10a can view display information represented on the display 14 and can perform an input operation on the keyboard 107 and the touch pad 109. In this case, the camera 28 can capture an image of the head of the user. In the following description, the first chassis 10a and the second chassis 10b may be collectively referred to as a "chassis".

The display 14 has a substantially flat plate shape and is configured as a display panel. The display 14 covers most of the surface of the first chassis 10a, and an outer periphery thereof is supported by the first chassis 10a. The display 14 includes a substrate 14b. A plurality of pixels 14p are two-dimensionally arranged on the substrate 14b at regular intervals. An area in which the plurality of pixels 14p are arranged constitutes a screen area SA. The display information is represented by a luminance or color distribution in the screen area SA. In a transmission area TA, which is a part of the screen area SA, the pixels 14p are more sparsely disposed than in a normal area NA, which is an area around the transmission area TA. In the transmission area TA, the adjacent pixels 14p are arranged with a gap without coming into complete contact with each other. Incident light on the transmission area TA passes through the gap between the pixels and is incident on an optical system of the camera 28. It should be noted that a pixel pitch between the pixels in the transmission area TA may be equal to a pixel pitch between the pixels in the normal area NA. In this case, a size of the pixel disposed in the transmission area TA may be smaller than a size of the pixel disposed in the normal area NA.

Figure 3:
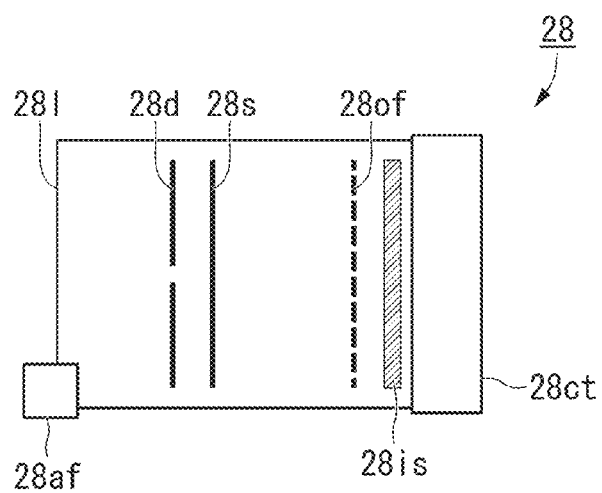
FIG. 3 is a cross-sectional view illustrating a configuration example of a camera according to the present embodiment.

Hereinafter, a configuration example of the camera 28 according to one or more embodiments will be described. FIG. 3 is a cross-sectional view illustrating the configuration example of the camera 28 according to one or more embodiments. The camera 28 has the optical system and captures an image of an object represented by the incident light on the optical system from the object distributed in the field of view. The camera 28 includes an objective lens 281, a stop 28d, a shutter 28s, an optical filter 28of, an imaging element 28is, an automatic focusing mechanism 28af, and a camera controller 28ct.

The incident light transmitted through the transmission area TA of the display 14 is incident on the objective lens 281. The objective lens 281 collects the incident light and presents the collected incident light to an imaging surface of the imaging element 28is through the stop 28d, the shutter 28s, and the optical filter 28of. The objective lens 281 is supported by the automatic focusing mechanism 28af, and is moved in a direction of an optical axis thereof in response to the control of the camera controller 28ct to make it possible to adjust a distance (in-focus distance) from the objective lens 281 to the imaging element 28*is* (focus control).

The stop 28*d* has a circular aperture portion at a center portion, and the incident light transmitted through the objective lens 281 passes through the aperture portion. The stop 28*d* is controlled by the camera controller 28*ct* to vary an effective aperture of the aperture portion by displacing a stop blades around the aperture portion (stop control).

The shutter 28*s* is controlled to be opened and closed in response to the control of the camera controller 28*ct*. An exposure time of the shutter 28*s* is controlled by the camera controller 28*ct* (exposure control). The optical filter 28*of* covers a surface of the imaging element 28*is* and transmits a part of components of the incident light which is transmitted through the objective lens 281 when the opening of the shutter 28*s*. The optical characteristics of the optical filter 28*of* are added to transmitted light transmitted through the optical filter 28*of*. As the optical characteristics, for example, spectral characteristics (color) are set. The optical filter 28*of* transmits light of a color received by each individual sub-pixel as a main component. It is determined in advance whether or not light of any one of red, green, or blue is received by each sub-pixel constituting the individual pixel.

The imaging element 28*is* has the imaging surface. A plurality of light-receiving elements are two-dimensionally arranged on the imaging surface. Each light-receiving element corresponds to the sub-pixel, detects the light transmitted through the optical filter 28*of*, and generates a voltage corresponding to an intensity of the detected light, that is, a brightness. A color is represented by a brightness set of each of the sub-pixels constituting one pixel. The camera controller 28*ct* generates image data indicating a color distribution for each pixel and outputs the image data to a host system 100 that constitutes a main body of the information processing apparatus 10. The color distribution for each pixel represents a captured image. The camera controller 28*ct* can open the shutter 28*s* to acquire the captured image in response to an imaging command from the host system 100.

It should be noted that, in the present application, a known method can be used as processing of determining an imaging parameter by the camera 28. Examples of the processing of determining the imaging parameter may include the focus control, and the exposure control, the stop control. The in-focus distance is determined by the focus control. The exposure time is determined by the exposure control. A stop value (f-number) is determined by the stop control. The stop value is a parameter of a luminance and a depth of field. The stop value corresponds to a quotient obtained by dividing a focal length of the objective lens 281 by the effective aperture of the stop 28*d*. The imaging parameter depends on an environment in the field of view, such as a spatial distribution or the luminance of the object in the field of view. In general, it is permitted to make the exposure time shorter and the stop value smaller as the environment is brighter. As the object closer to the camera 28 is a main object, the in-focus distance is adjusted to be shorter such that a focus degree (focus) on the object is higher. For example, a ratio of a high spatial frequency component to a low spatial frequency component in the captured image is used as the focus degree. The stop value is adjusted to be larger as the dispersion of the distance from the camera 28 to the object is larger. Since these imaging parameters are dependent on each other, the imaging parameters are determined such that an image quality is comprehensively optimized. A parameter of the image quality may be generally represented by a weighted sum of a plurality of factors, such as the focus degree and a contrast. In this case, a weight coefficient for each factor is set in advance as a degree of contribution of the factor. It should be noted that the imaging parameter may be set in response to a user operation.

The information processing apparatus 10 estimates a light source area representing a light source based on a brightness distribution of the captured image captured by the camera 28, and determines an artifact distribution around the light source area based on an artifact pattern set in advance. The information processing apparatus 10 uses a learning model that has learned in advance a relationship between a display non-transmission image captured without transmission through the display 14 and a display transmission image captured with transmission through the display 14, to estimate a correction image based on the captured image captured by the camera 28. The information processing apparatus 10 determines an applied intensity of the correction image based on the estimated artifact distribution, and combines the correction image and the captured image based on the determined applied intensity.

Figure 4:
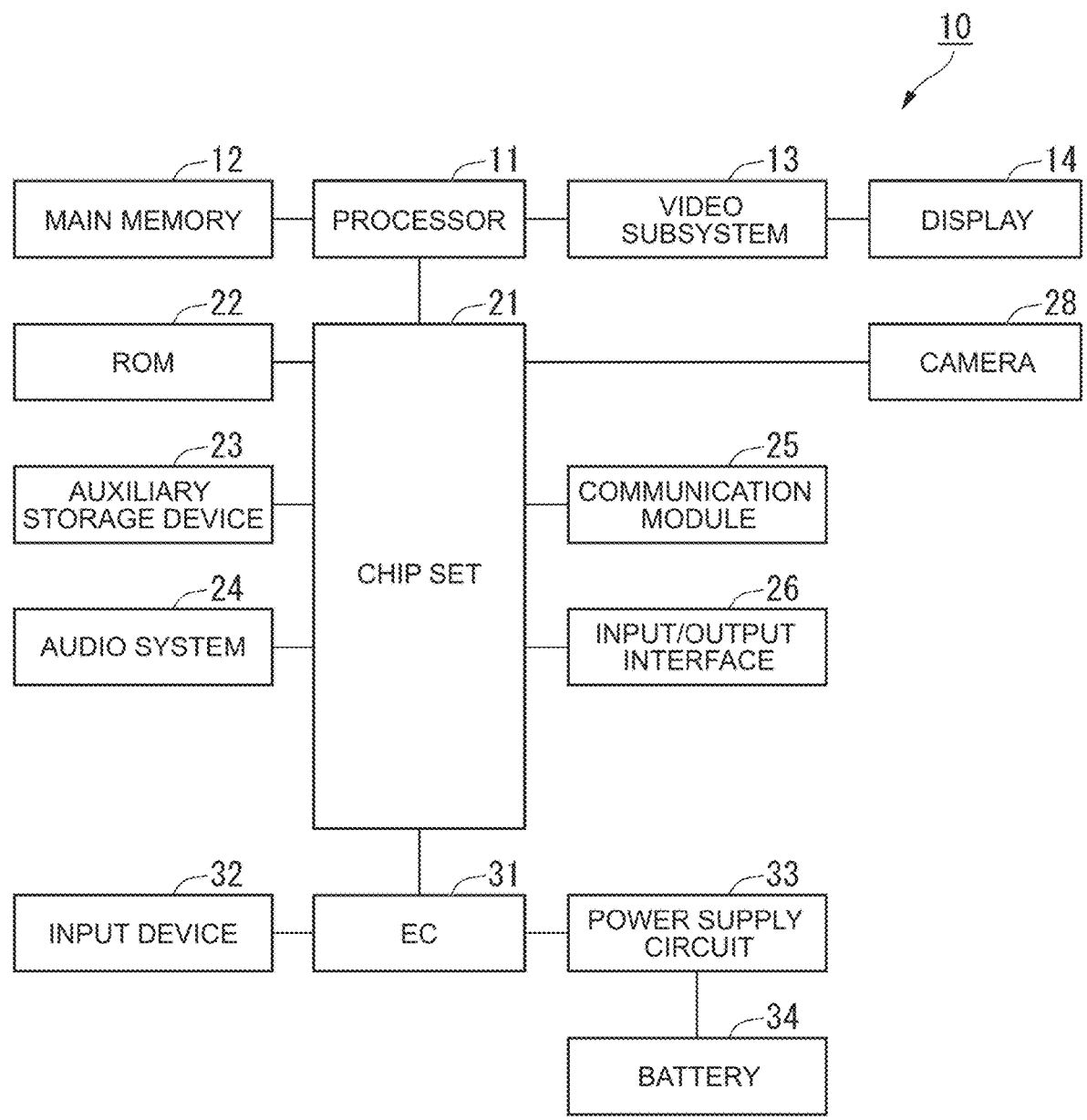
FIG. 4 is a schematic block diagram illustrating a hardware configuration example of the information processing apparatus according to the present embodiment.

Hereinafter, a hardware configuration example of the information processing apparatus 10 according to one or more embodiments will be described. FIG. 4 is a schematic block diagram illustrating the hardware configuration example of the information processing apparatus 10 according to one or more embodiments. The information processing apparatus 10 includes a processor 11, a main memory 12, a video subsystem 13, the display 14, a chip set 21, a read-only memory (ROM) 22, an auxiliary storage device 23, an audio system 24, a communication module 25, an input/output interface 26, the camera 28, an embedded controller (EC) 31, an input device 32, a power supply circuit 33, and a battery 34.

The processor 11 is a core processing device that executes various arithmetic processing for which an instruction is given by a command described in software (program). The processing executed by the processor 11 includes reading and writing of data with a storage medium, such as the main memory 12 or the auxiliary storage device 23, input and output with other devices, and the like. The processor 11 includes at least one CPU. The CPU controls an operation of the entire information processing apparatus 10. The CPU executes, for example, processing based on a program, such as an operating system (OS), firmware, a device driver, a utility, and an application program (also referred to as an "app" in the present application). It should be noted that, in the present application, the execution of processing for which an instruction is given by commands described in various programs may be referred to as "execute a program", "execution of a program", or the like.

The main memory 12 is a writable memory that is used as a reading area of the execution program of the processor 11 or as a work area in which processing data of the execution program is written. The main memory 12 is configured by, for example, a plurality of dynamic random access memory (DRAM) chips. The processor 11 and the main memory 12 correspond to minimum hardware constituting the host system 100 (described later). The host system 100 is a computer system that is a core of the information processing apparatus 10.

The video subsystem 13 is a subsystem for realizing a function related to image display, and includes a video controller. The video controller processes a rendering command from the processor 11, writes the obtained rendering information into a video memory, reads out the rendering information from the video memory, and outputs the rendering information to the display 14 as display data indicating the display information (image processing).

The display 14 displays a display screen based on the display data input from the video subsystem 13. For example, the display 14 may be any display, such as a liquid crystal display (LCD) or an organic light emitting diode (OLED) display.

The chip set 21 includes a plurality of controllers, and is connectable to a plurality of devices to input and output various data. The controller is, for example, any one or a combination of bus controllers such as a mobile industry processor interface (MIPI), a universal serial bus (USB), a serial AT attachment (ATA), a serial peripheral interface (SPI) bus, a peripheral component interconnect (PCI) bus, a PCI-express bus, and a low pin count (LPC). Examples of the plurality of devices include the ROM 22, the auxiliary storage device 23, the audio system 24, the communication module 25, the input/output interface 26, the camera 28, and the EC 31, which will be described later.

The ROM 22 mainly stores system firmware, firmware for controlling operations of the EC 31 and other devices, and the like. The ROM 22 may be, for example, any one of an electrically erasable programmable read only memory (EEPROM) or a flash ROM.

The auxiliary storage device 23 stores various data used for processing of the processor 11 and other devices, various data acquired by the processing, various programs, and the like. The auxiliary storage device 23 may be, for example, any one or any combination of a solid state drive (SSD) and a hard disk drive (HDD).

A microphone and a speaker (not illustrated) are connected to the audio system 24 to record, reproduce, and output audio data. It should be noted that the microphone and the speaker may be built in the information processing apparatus 10 or may be separate from the information processing apparatus 10.

The communication module 25 is connected to a communication network in a wireless or wired manner. The communication module 25 communicates various data with other apparatuses connected to the communication network. The communication module includes, for example, a wireless local area network (LAN), and can transmit and receive various data between the apparatuses in accordance with a predetermined wireless communication method (for example, IEEE 802.11). In the wireless LAN, the communication between the apparatuses is executed via an access point.

The input/output interface 26 is connected to various devices, such as a peripheral device, in a wired or wireless manner. The input/output interface 26 is, for example, a connector for inputting and outputting data in a wire manner in accordance with a USB standard.

The camera 28 captures an image including an image of the object located in the field of view. The camera 28 outputs the image data indicating the captured image obtained by the imaging to the processor 11 via the chip set 21.

The EC 31 is a one-chip microcomputer that monitors and controls various devices (peripheral devices, sensors, and the like) regardless of an operating state of the system of the information processing apparatus 10. The EC 31 includes a CPU, a ROM, a RAM, a plurality of channels of analog-to-digital (A/D) input terminals, a digital-to-analog (D/A) output terminal, a timer, and digital input/output terminals (not illustrated) separately from the processor 11. For example, the input device 32, the power supply circuit 33, and the like are connected to the input/output terminals of the EC 31.

The input device 32 detects an operation of the user and outputs an operation signal corresponding to the detected operation to the EC 31. The keyboard 107 and the touch pad 109 correspond to the input device 32. The input device 32 may be a touch sensor, or may overlap the display 14 and be configured as a touch panel.

The power supply circuit 33 converts a voltage of direct current power supplied from an external power supply or the battery 34 into a voltage required for the operation of each device constituting the information processing apparatus 10, and supplies the power having the converted voltage to the device as a supply destination. The power supply circuit 33 supplies the power in response to the control of the EC 31. The power supply circuit 33 includes a converter that converts a voltage of the power supplied thereto and a power supplier that charges the battery 34 with the power of which the voltage is converted. The power supplier charges the battery 34 with the remaining power that is not consumed in each device in the power supplied from the external power supply. In a case in which the power is not supplied from the external power supply or in a case in which the power supplied from the external power supply is insufficient, the power discharged from the battery 34 is supplied to each device as operation power.

The battery 34 charges or discharges the power using the power supply circuit 33. The battery 34 may be, for example, any one of a lithium ion battery, a sodium ion battery, or the like.

Figure 5:
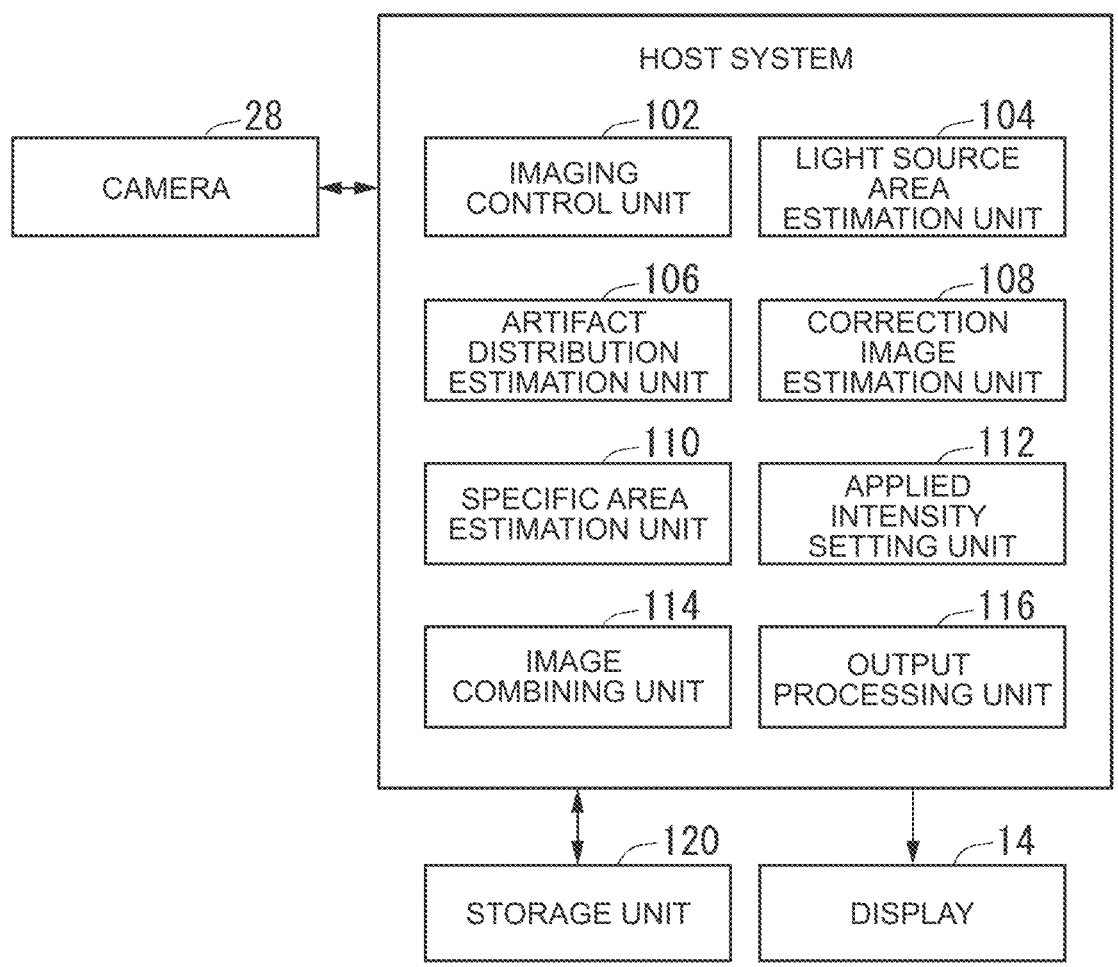
FIG. 5 is a schematic block diagram illustrating a functional configuration example of the information processing apparatus according to the present embodiment.

Hereinafter, a functional configuration example of the information processing apparatus 10 according to one or more embodiments will be described. FIG. 5 is a schematic block diagram illustrating the functional configuration example of the information processing apparatus 10 according to one or more embodiments. The information processing apparatus 10 includes the camera 28, the host system 100, the display 14, and a storage unit 120. A part or all of the functions of the host system 100 are realized by the processor 11 executing an application program (referred to as an "app" in the present application) and other programs on the OS, and cooperating with the main memory 12, the camera 28, the display 14, the storage unit 120, and other hardware.

The host system 100 includes an imaging control unit 102, a light source area estimation unit 104, an artifact distribution estimation unit 106, a correction image estimation unit 108, a specific area estimation unit 110, an applied intensity setting unit 112, an image combining unit 114, and an output processing unit 116.

The imaging control unit 102 generates an imaging command and outputs the generated imaging command to the camera 28. In a case in which the imaging command is input from the imaging control unit 102, the camera controller 28*ct* causes the imaging element 28*is* to capture the image of the object located in the field of view.

Typical examples of a timing at which the imaging control unit 102 issues the imaging command include a case in which an operation signal generated in response to pressing a shutter button (not illustrated) is detected, a case in which an operation signal indicating the imaging is detected from the input/output interface 26, and a case in which there is a call by processing related to another app. The imaging control unit 102 may notify the camera 28 of the imaging parameter, for example, any one or a combination of the in-focus distance, the exposure time, the f-number, in association with the imaging command, and may cause the camera 28 to execute the imaging depending on the imaging parameter. The imaging control unit 102 may adopt the imaging parameter indicated by the operation signal input from the input device 32 or the input/output interface 26, or may adopt the imaging parameter indicated by the execution of another app. In a case in which the camera controller 28ct controls the imaging parameter depending on the environment in the field of view (automatic control), the camera controller 28ct notifies the imaging control unit 102 of the imaging parameter determined by itself. The imaging control unit 102 need not notify the camera 28 of the imaging parameter set by itself.

The light source area estimation unit 104 estimates an area in which the light source is represented as the object, as the light source area, based on the brightness distribution of the captured image indicated by the image data acquired from the camera 28. The light source area estimation unit 104 detects a portion of a pixel having a brightness value equal to or greater than a predetermined upper limit value as a bright portion with reference to the image data, and estimates an area in which the bright portions are adjacent to each other over a certain size or larger, as the light source area. In a case in which a color signal value is given for each pixel, the brightness value is given by a weighted average of the color signal value for each color. The light source area estimation unit 104 outputs light source area data indicating the estimated light source area to the artifact distribution estimation unit 106.

Figure 10:
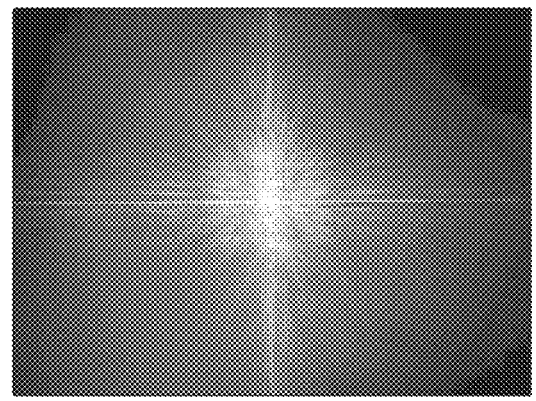
FIG. 10 is a diagram illustrating an example of an artifact pattern.

The artifact distribution estimation unit 106 estimates the artifact distribution in the captured image based on the light source area data input from the light source area estimation unit 104, and the artifact pattern. The artifact distribution estimation unit 106 estimates an inclusive artifact distribution by superimposing the artifact pattern on each pixel included in the light source area indicated by the light source area data. The artifact pattern corresponds to an artifact distribution generated around a point light source. The artifact pattern can also be regarded as one type of point image distribution function. In the example of FIG. 10, the artifact pattern is represented by a pixel-by-pixel distribution value in a two-dimensional space with a position of the point light source as an origin. The pixel-by-pixel distribution value is a value representing the luminance of each pixel, similarly to the brightness value. In the artifact pattern illustrated in FIG. 10, the artifact is darker as a distance from the point light source is larger, and a bright area is spread wider in a horizontal direction and a vertical direction than in an intersection direction of the horizontal direction and the vertical direction. The artifact pattern may be actually measured in advance, or may be represented by using a geometric model.

In a case in which the artifact pattern is actually measured, two types of the captured images are captured by the camera 28. One captured image is a light source image captured in a situation in which the light source having a sufficiently small diameter and a known brightness is disposed in the field of view of the camera 28. It is desirable that the diameter of the light source is equal to or less than a resolution of the camera 28. In this case, the light source is regarded as the point light source. On the other hand, the captured image is a background image captured in a situation in which the light source is excluded from the field of view of the camera 28. A difference value obtained by subtracting a signal value of the background image from a signal value of the light source image for each pixel corresponds to the artifact pattern.

Figure 11:
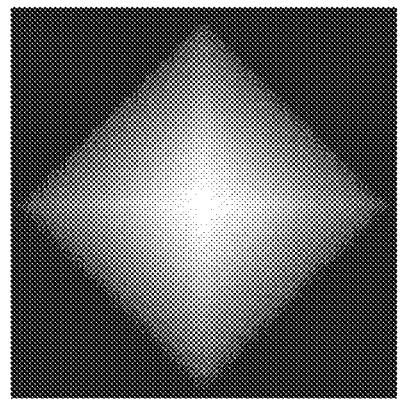
FIG. 11 is a diagram illustrating another example of the artifact pattern.

FIG. 11 illustrates the artifact pattern represented by using the geometric model. In the illustrated geometric model, an artifact that is spread wider in the horizontal direction and the vertical direction than in the intersection direction of the horizontal direction and the vertical direction are represented. The artifact pattern is represented by a radial component depending on a radius vector with the position of the light source as an origin and a directional component depending on a direction from the origin. The radial component is represented by a function that attenuates to zero as a distance from the origin increases. The radial component is represented by, for example, a Bessel function or a Hankel function. The directional component is represented by a function representing a directional dependency of a spatial frequency up to at least four periods. The directional component is represented by, for example, a sine function or a cosine function.

Returning to FIG. 5, the artifact distribution estimation unit 106 calculates a cumulative value obtained by accumulating the pixel-by-pixel distribution values by the individual point light sources for each pixel as an artifact distribution value. The inclusive artifact distribution is represented by the artifact distribution value for each pixel. The artifact distribution estimation unit 106 can exclude the light source area from the inclusive artifact distribution and estimate the artifact distribution that occurs at an outer edge of the light source area. In a case in which the light source area is excluded, the artifact distribution estimation unit 106 sets the artifact distribution value for each pixel belonging to the light source area among the artifact distribution values for each pixel representing the inclusive artifact distribution to a predetermined reference value (for example, 0). The artifact distribution estimation unit 106 outputs artifact distribution data indicating the estimated artifact distribution to the applied intensity setting unit 112.

The correction image estimation unit 108 estimates the correction image based on the captured image indicated by the image data acquired from the camera 28 by using a trained machine learning model. The machine learning model is also referred to as an artificial intelligence (AI) model, is a method of executing arithmetic processing on input to derive output, and can acquire a relationship between the input and the output through learning. The machine learning model according to one or more embodiments is caused to learn in advance a relationship in which an image (in the present application, may be referred to as a "first image") captured with the transmission through the display in another apparatus is used as input and an image (in the present application, may be referred to as a "second image") captured without the transmission through the display is used as output. It is expected that, by using an apparatus having the same specifications as the information processing apparatus 10 as another apparatus for the learning, the artifact occurring due to the transmission through the display 14 in the captured image is removed in the correction image. The correction image estimation unit 108 outputs the correction image data indicating the estimated correction image to the image combining unit 114.

The specific area estimation unit 110 estimates an area in which a specific object is represented in the captured images indicated by the image data acquired from the camera 28, as the specific area. The specific area estimation unit 110 can estimate the specific area by executing, for example, known image recognition processing on the captured image. As the specific object, for example, a person (particularly the head), an object of interest to the user such as a picture or a flower, or an object having a relatively significant influence on visual impression due to the artifact may be applied. The specific area can also be regarded as an area of interest. The specific area estimation unit 110 outputs specific area data indicating the estimated specific area to the applied intensity setting unit 112.

The applied intensity setting unit 112 determines the applied intensity of the correction image based on the artifact distribution data input from the artifact distribution estimation unit 106. The applied intensity is a weight value indicating a degree of application of the correction image in a case in which the correction image and the captured image are combined. The applied intensity setting unit 112 normalizes the artifact distribution value for each pixel indicated by the artifact distribution data such that the maximum value is 1 and the minimum value is 0, to determine the applied intensity. The applied intensity setting unit 112 configures a weight filter indicating the applied intensity determined for each pixel. The applied intensity setting unit 112 may set the specific area indicated by the specific area data input from the specific area estimation unit 110 as an application exclusion area in which the application of the correction image is excluded. In a case of setting the application exclusion area, the applied intensity setting unit 112 sets the applied intensity for each pixel in the specific area to, for example, 0.

The applied intensity setting unit 112 outputs the configured weight filter to the image combining unit 114.

The image combining unit 114 combines the captured image indicated by the image data input from the camera 28 and the correction image indicated by the correction image data input from the correction image estimation unit 108, as the output image, by using the weight filter input from the applied intensity setting unit 112. The image combining unit 114 determines a weighted sum of the color signal value of the correction image for each pixel and the color signal value of the captured image, as a color signal value of the output image (blending). In a case of calculating the weighted sum, for example, the applied intensity for the pixel is used as the weight value for the color signal value of the correction image, and the difference value obtained by subtracting the applied intensity from 1 is used as the weight value for the color signal value of the captured image (alpha blending). The component of the correction image is mainly present around the light source area, and the component of the captured image increases as the distance from the light source area increases. Therefore, it is possible to suppress a variation in the luminance or the hue that occurs in the correction image while reducing the influence of the artifact. The image combining unit 114 outputs output image data indicating the combined output image to the output processing unit 116.

It should be noted that the method of combining the correction image and the captured image to obtain the output image is not limited to this. For example, any of dissolving or multiplying method may be used, or a combination of these methods may be used. The dissolving is a method of adopting a signal value of a pixel in one image with a probability corresponding to the applied intensity of the individual pixel, and adopting a signal value of a pixel in the other image in a case in which the signal value is not adopted. The multiplying is a method of normalizing a product of a value obtained by raising the signal value of an individual pixel in one image to the power of the applied intensity for that pixel a value obtained by raising the signal value for the pixel of the other image to the power of the difference value obtained by subtracting the applied intensity from 1, and determining the signal value for the pixel.

The output processing unit 116 executes processing related to the output of the output image data acquired from the image combining unit 114. The output processing unit 116 may output the output image data to another apparatus via the display 14 or the input/output interface 26, or may store the output image data in the storage unit 120. An output destination of the output image data may be indicated by the operation signal input from the input device 32 or the input/output interface 26, or may be indicated by the execution of another app.

Figure 6:
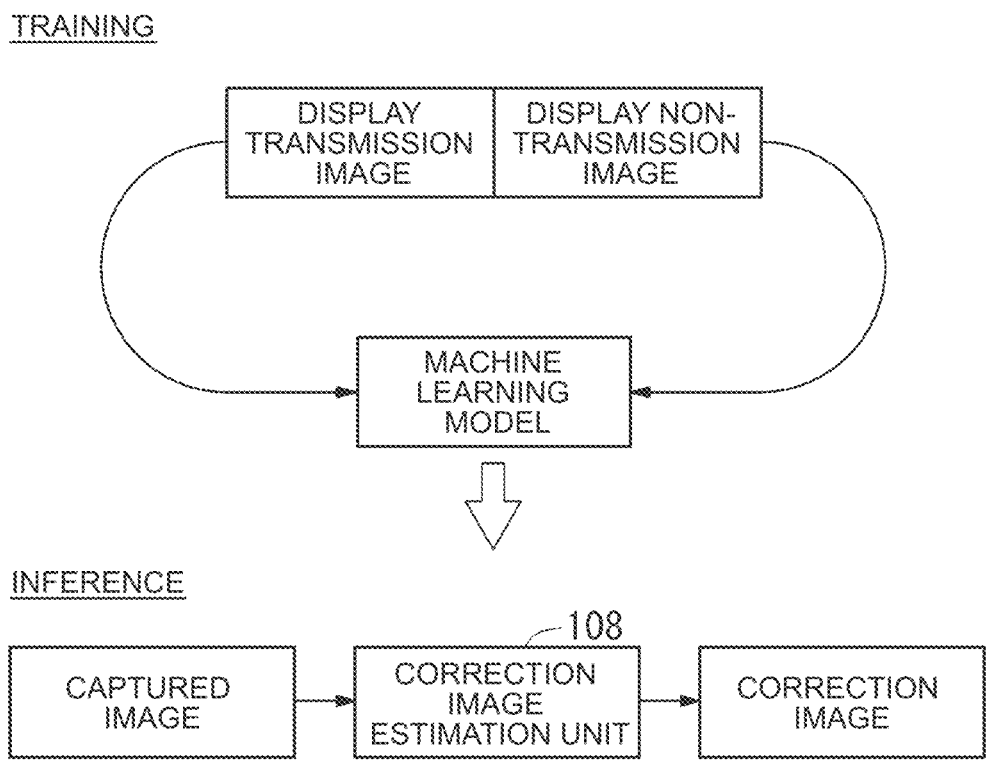
FIG. 6 is an explanatory diagram illustrating a machine learning model according to the present embodiment.

Hereinafter, the machine learning model according to one or more embodiments will be described with reference to FIG. 6. The machine learning model according to one or more embodiments is used in the correction image estimation unit 108 to estimate the correction image from the captured image (inference). As the machine learning model, for example, a neural network such as a convolutional neural network (CNN) may be used, or a mathematical model other than the neural network such as a random forest may be used. In order to execute the inference, the machine learning model is caused to learn in advance the relationship between the first image (display transmission image) as the input and the second image (display non-transmission image) as the output.

Before executing the learning, training data is prepared in advance. The training data includes a plurality of sets of the first image constituting the input data, and the second image constituting the output data corresponding to the input data. In the learning, a parameter set of the machine learning model is recursively updated such that a difference between estimation data obtained by using the machine learning model for the input data and the output data corresponding to the input data is minimized as the entire training data. As a magnitude of the difference, for example, an index value such as a simple sum of squares, a weighted sum of squares, or cross entropy of the color signal values for each pixel is used. In the update of the parameter set, a method such as a gradient descent method or a stochastic gradient descent method is used. The information processing apparatus 10 may include a model training unit (not illustrated) that trains the machine learning model, or need not include the model training unit. The correction image estimation unit 108 may be set with the parameter of the machine learning model obtained through learning from another apparatus.

Figure 7:
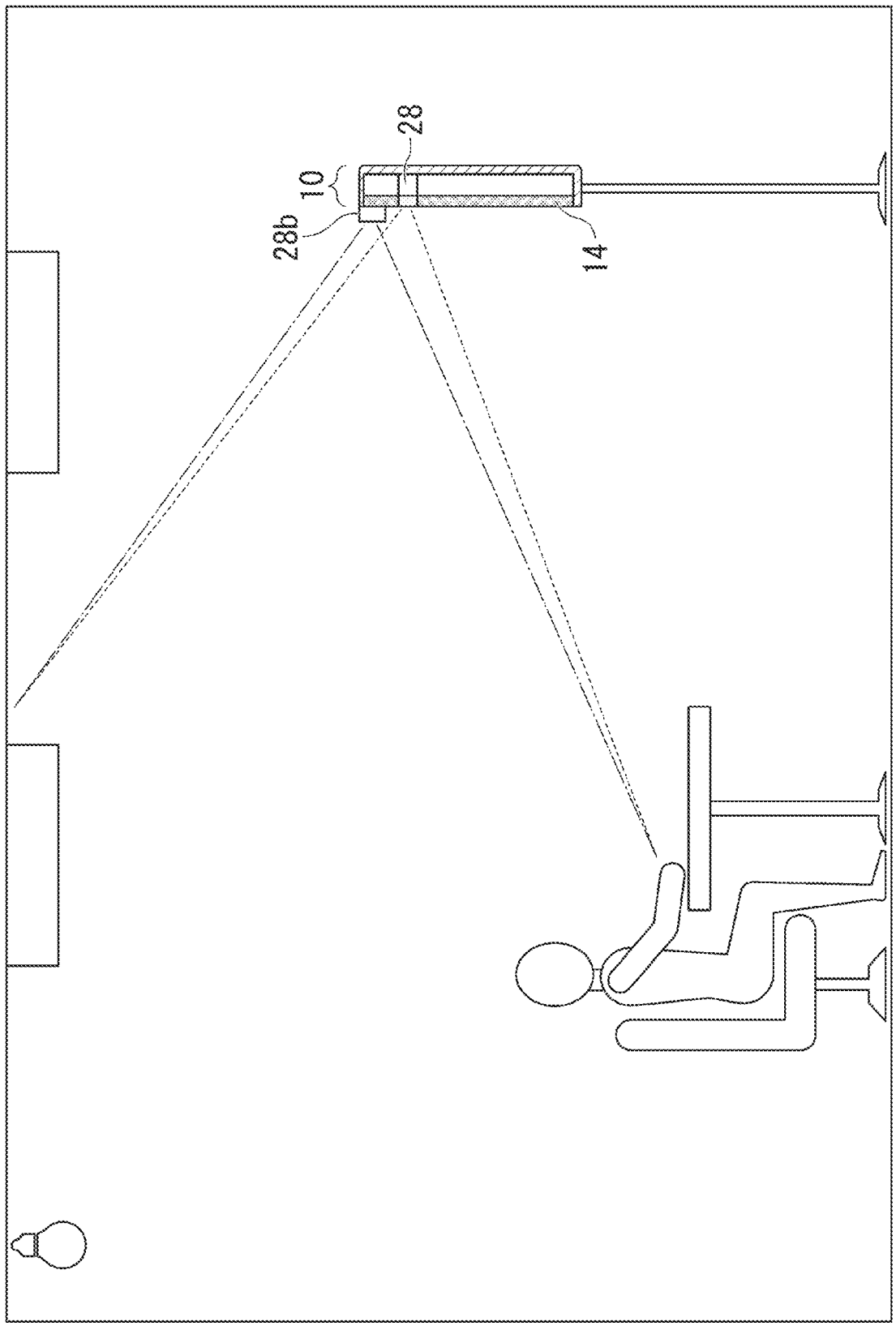
FIG. 7 is a diagram illustrating an imaging environment of a first image and a second image.

It is suitable that the first image and the second image are captured under the same conditions as much as possible for the object in the same field of view in each data set constituting the training data. In the example of FIG. 7, the first image is captured by using the camera 28 provided in the information processing apparatus 10. The incident light transmitted through the transmission area TA of the display 14 is incident on the optical system of the camera 28. The second image is captured by using a camera 28b provided on a front surface of a raised bottom of the display 14. The camera 28b is disposed at a position that does not cover the screen area of the display 14 and is as close as possible to the transmission area TA. The optical axes of the cameras 28 and 28b are directed in a normal direction of the screen area of the display 14. Under this disposition, each of the fields of view of the cameras 28 and 28b includes the head of the person located in front and an illumination installed on a ceiling as common objects. The fields of view of the captured images do not completely match each other due to a difference in the positions between the cameras 28 and 28b. The coordinate conversion may be executed such that the positions of the images of the common objects in one captured image match the positions and the orientations of the images of the common objects in the other captured image in a common area representing the common objects between the captured images. In a case of constituting the training data, it is desirable to change at least one of the object or the disposition of the object for each data set in the imaging.

Figure 8:
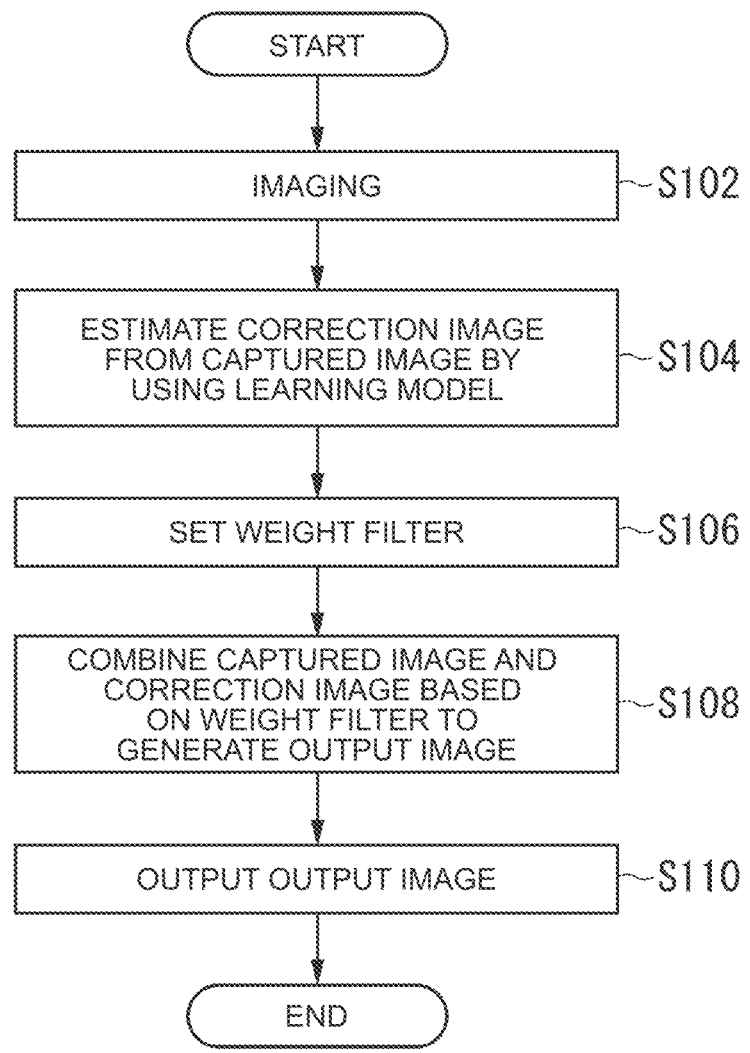
FIG. 8 is a flowchart illustrating an image processing method according to the present embodiment.

Hereinafter, an example of an image processing method according to one or more embodiments will be described. FIG. 8 is a flowchart illustrating the image processing method according to one or more embodiments.

(Step S102) The imaging control unit 102 causes the camera 28 to capture the image of the object located in the field of view.

(Step S104) The correction image estimation unit 108 estimates the correction image from the captured image captured by the camera 28 by using the machine learning model.

(Step S106) The applied intensity setting unit 112 generates the weight filter indicating the applied intensity of the correction image for each pixel based on the artifact distribution estimated from the captured image (weight filter setting).

(Step S108) The image combining unit 114 combines the captured image and the correction image by using the generated weight filter, to generate the output image.

(Step S110) The output processing unit 116 outputs the generated output image data to the display 14.

Figure 9:
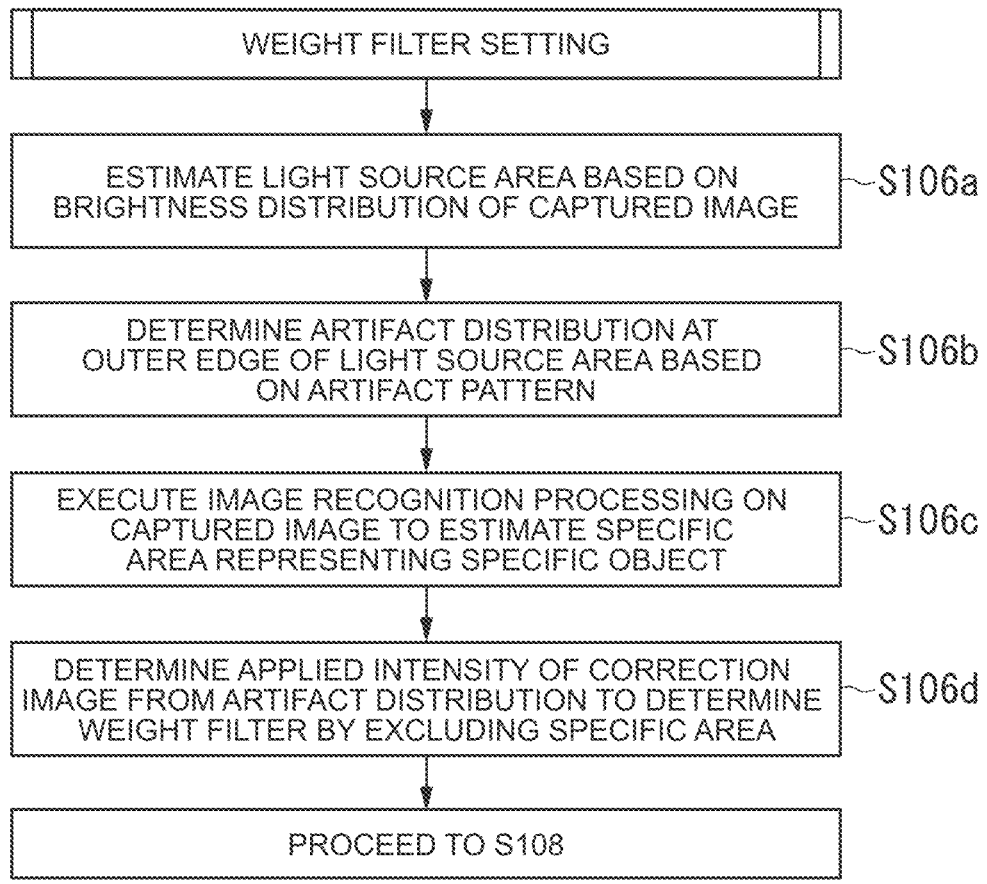
FIG. 9 is a flowchart illustrating weight filter setting processing according to the present embodiment.

Hereinafter, an example of weight filter setting processing according to one or more embodiments will be described. FIG. 9 is a flowchart illustrating the weight filter setting processing according to one or more embodiments.

(Step S106a) The light source area estimation unit 104 estimates the area including the pixel having the brightness value equal to or greater than the upper limit value from the brightness distribution of the captured image captured by the camera 28, as the light source area.

(Step S106b) The artifact distribution estimation unit 106 estimates the inclusive artifact distribution by superimposing the artifact pattern for each pixel disposed in the estimated light source area. The artifact distribution estimation unit 106 excludes the light source area from the estimated inclusive artifact distribution, to determine the artifact distribution at the outer edge of the light source area.

(Step S106c) The specific area estimation unit 110 executes the image recognition processing on the captured image captured by the camera 28 and estimates the area in which the specific object is represented as the specific area.

(Step S106d) The applied intensity setting unit 112 normalizes the artifact distribution value constituting the artifact distribution, to determine the applied intensity. The applied intensity setting unit 112 determines the weight filter indicating the applied intensity of the correction image for each pixel by excluding the estimated specific area from the area in which the applied intensity has a value significantly equal to or greater than 0. The determined weight filter is used in processing of step S108.

Figure 12:
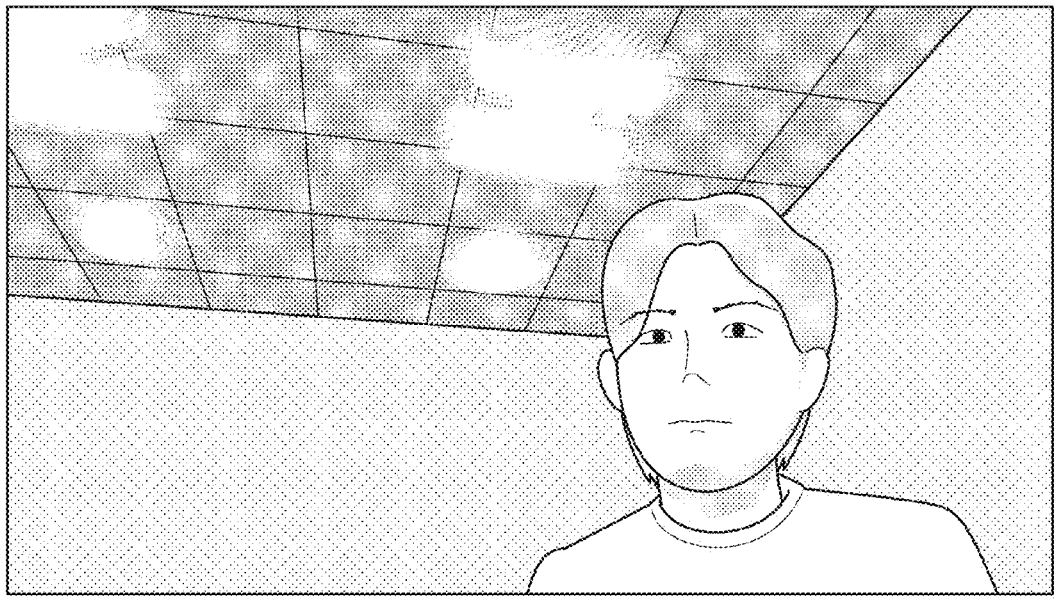
FIG. 12 is a diagram illustrating an example of a captured image.

Hereinafter, an example of the captured image will be described. FIG. 12 illustrates an example of the captured image captured by the camera 28 in the imaging environment illustrated in FIG. 7. An image of an upper body of a person sitting on a chair indoors is represented in a lower right portion of the captured image. A wall surface and a ceiling that cover an indoor space are represented in a background portion of the captured image. An image of an illumination installed on the ceiling is represented in a blur. The blur occurring around the illumination corresponds to the artifact that does not actually exist. In particular, blur portions of two illuminations above the central portion are spatially connected.

Figure 13:
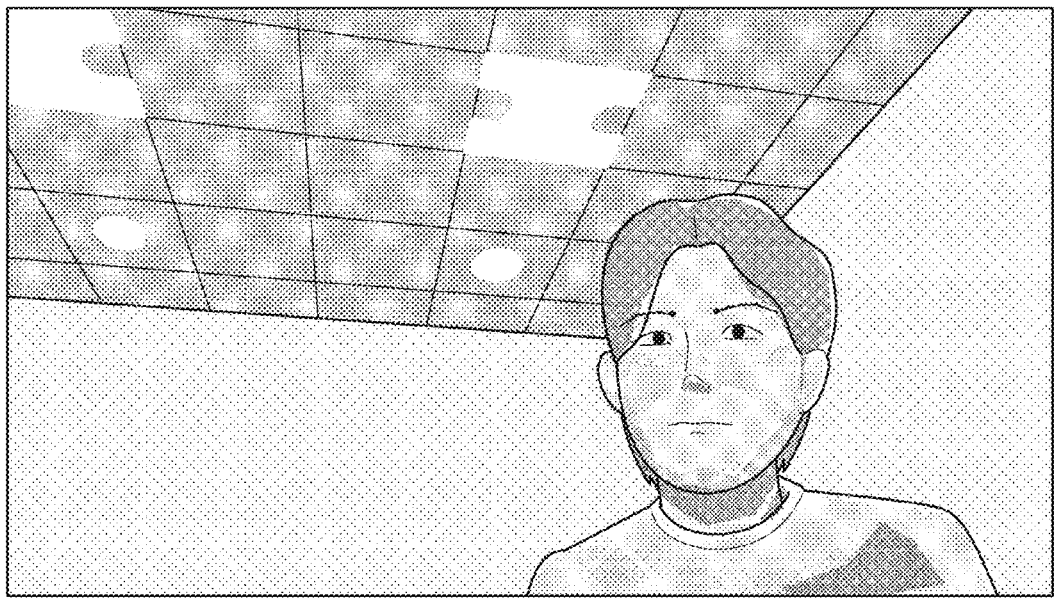
FIG. 13 is a diagram illustrating an example of a correction image.

FIG. 13 is a diagram illustrating the correction image. The correction image of FIG. 13 is an image estimated by using the machine learning model with respect to the captured image of FIG. 12. In the correction image, the blur around the illumination is suppressed more than in the captured image. However, in some cases, the two illuminations are imaged in a connected form due to the fact that the illuminations of the input image are close to the camera 28 and the exposure is excessive. This phenomenon may occur even in a case of the imaging via a camera that is not covered with the display, but often occurs in the CUD method in which an amount of light transmitted through the display 14 is reduced. This phenomenon should be corrected in a natural form, but a part of the brightness of the bright area of the captured image exceeds the upper limit and exceeds a range that can be corrected by the machine learning model. Therefore, the correction is performed in an unnatural form. In addition, the luminance distribution of the image of the person in the correction image varies from that of the captured image. More specifically, the entire image is dark, and the light and dark are emphasized. This variation may change the impression on the user and may cause discomfort to the correction image. A facial expression of the person appearing in the correction image is different from that of the person appearing in the captured image. On the other hand, in one or more embodiments, this phenomenon is relaxed by increasing the component of the correction image around the light source and decreasing the component of the correction image in the portion away from the light source.

Figure 14:
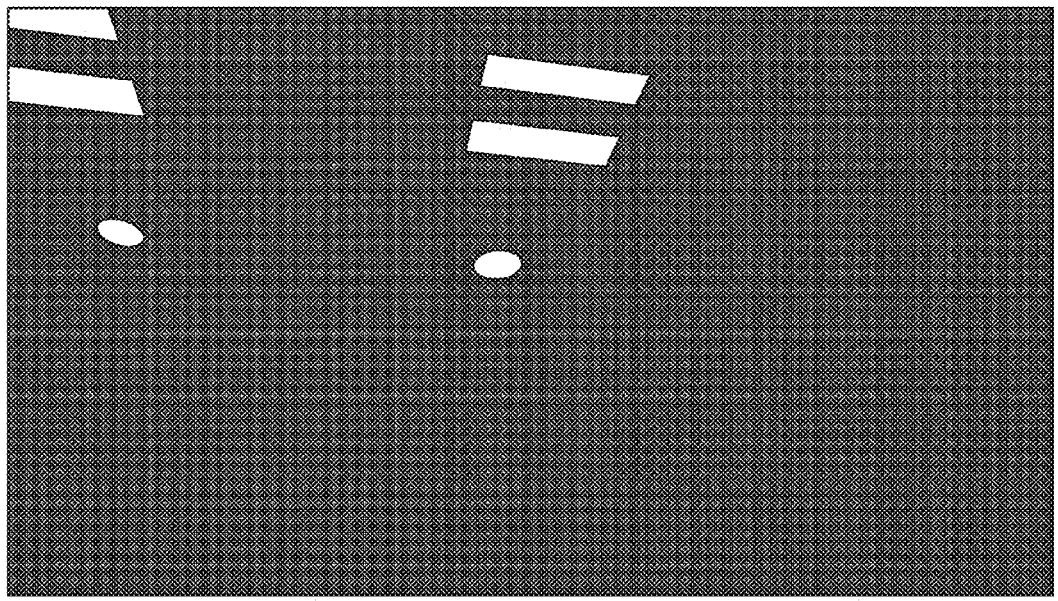
FIG. 14 is a diagram illustrating an example of a light source area.

FIG. 14 is a diagram illustrating the light source area. The light source area illustrated in FIG. 14 is an area estimated based on the brightness of the captured image of FIG. 12. A white portion represents the light source area, and a black filled portion represents an area that does not correspond to the light source area. The light source area estimation unit 104 detects the bright portion extending in a certain range as the light source area, whereby an outline of the light source area is defined.

Figure 15:
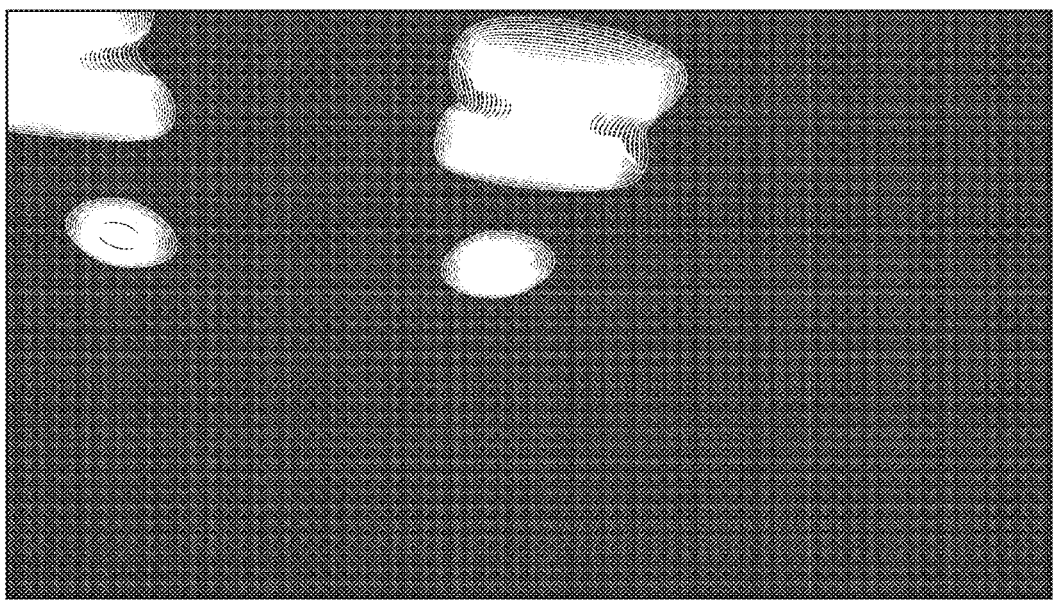
FIG. 15 is a diagram illustrating an example of an inclusive artifact distribution.

FIG. 15 is a diagram illustrating the inclusive artifact distribution. In the inclusive artifact distribution illustrated in FIG. 15, the artifact pattern illustrated in FIG. 10 is formed by superimposing the artifact pattern for each pixel constituting the light source area illustrated in FIG. 14.

Figure 16:
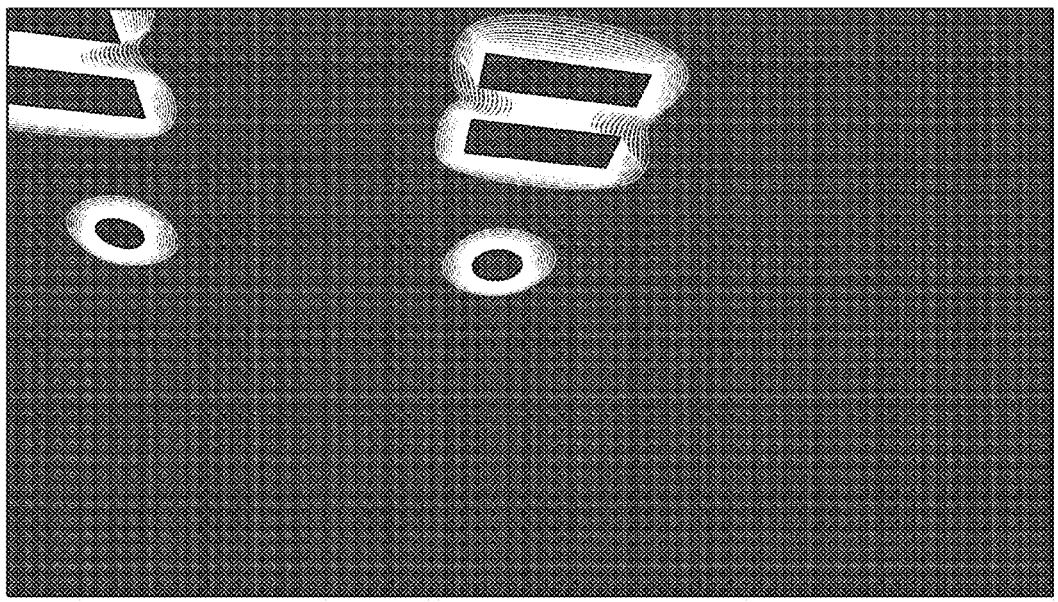
FIG. 16 is a diagram illustrating an example of an artifact distribution.

FIG. 16 is a diagram illustrating the artifact distribution. The artifact distribution illustrated in FIG. 16 is obtained by removing the light source area from the inclusive artifact distribution illustrated in FIG. 15. By removing the light source area from the inclusive artifact distribution, the artifact distribution around the light source is extracted.

Figure 17:
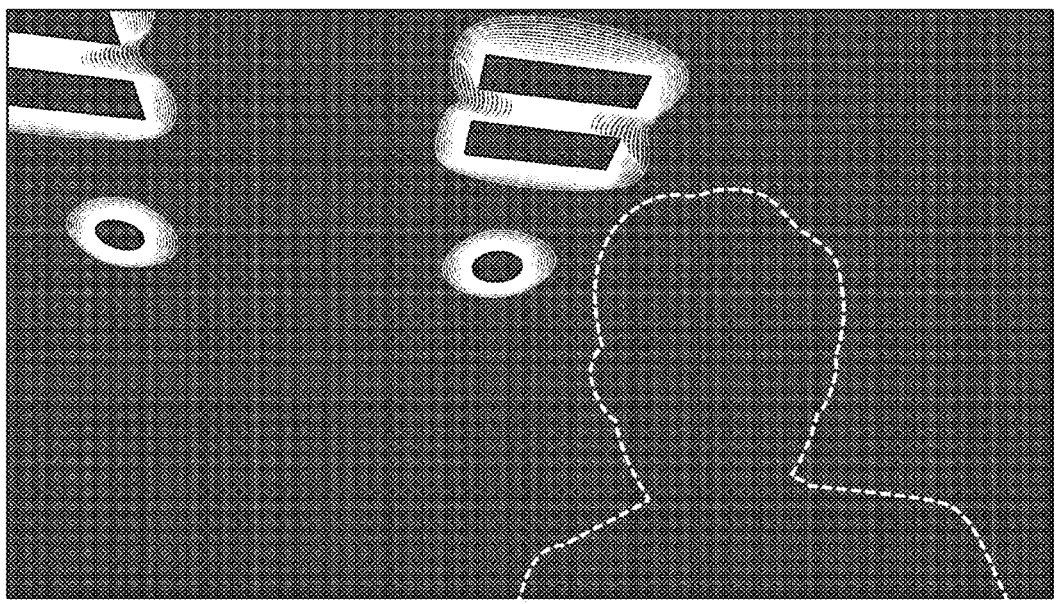
FIG. 17 is a diagram illustrating an example of a specific area.

FIG. 17 is a diagram illustrating the specific area. The specific area is an area surrounded by a white broken line. The illustrated specific area is an area in which the head of the person is highly likely to exist as the specific object by executing the image recognition processing from the captured image illustrated in FIG. 12. The applied intensity setting unit 112 determines the weight filter such that the applied intensity of the correction image is higher and the applied intensity of the captured image is lower in an area in which the component of the artifact is more remarkable in the artifact distribution illustrated in FIG. 17. The applied intensity setting unit 112 sets the applied intensity to 0 for the specific area such that the correction image is not applied.

Figure 18:
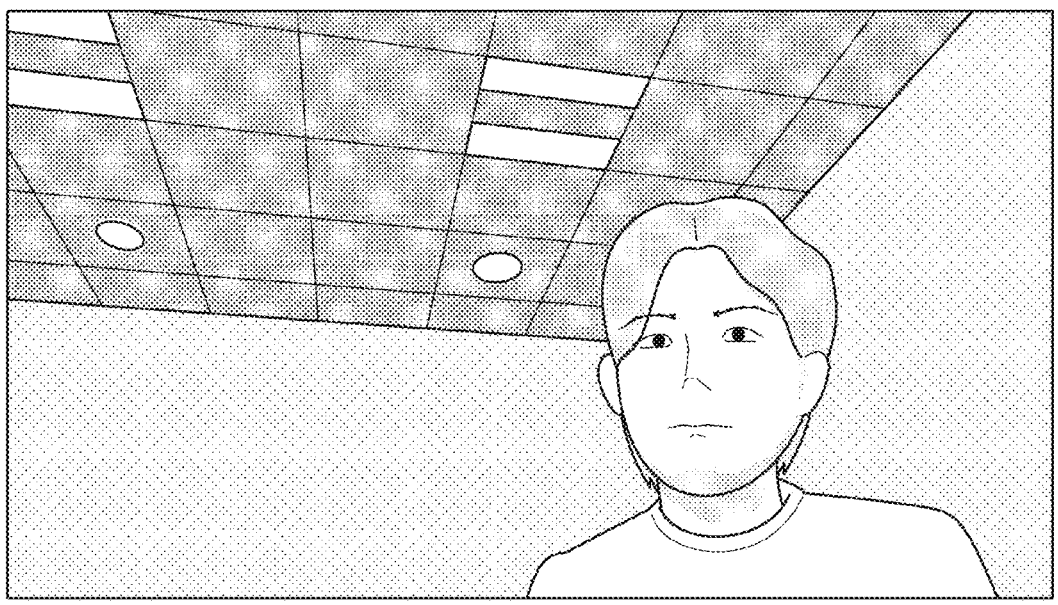
FIG. 18 is a diagram illustrating an example of an output image.

FIG. 18 is a diagram illustrating the output image. The illustrated output image is an image in which the captured image illustrated in FIG. 12 and the correction image illustrated in FIG. 13 are combined by the image combining unit 114 using the weight filter. The weight filter is determined based on the artifact distribution and the specific area illustrated in FIG. 17. The blur around the light source is suppressed, and the outline is clearly visible. In addition, an unnatural brightness distribution due to the machine learning model does not occur in the area of the image of the person. Therefore, both the suppression of the artifact around the light source in the correction image and the naturalness of the brightness distribution in the captured image are achieved, so that the output image obtains a higher image quality than the correction image.

It should be noted that, in the above description, as an example, a case has been described in which the artifact pattern is mainly constant, but the present application is not limited thereto. The artifact pattern may be variable depending on the imaging parameter of the camera 28. As described above, the imaging parameter is acquired by the imaging control unit 102. The imaging parameter may be determined depending on the environment within the field of view of the camera 28, or may be determined in response to the operation of the user. In this case as well, the user may determine the imaging parameter in consideration of the environment within the field of view.

Therefore, the artifact distribution estimation unit 106 sets artifact pattern data indicating the relationship with the artifact pattern for each imaging parameter in advance, and determines the artifact pattern data corresponding to an imaging pattern acquired from the imaging control unit 102 with reference to the set artifact pattern data. The artifact pattern data may have a form of a data table indicating the artifact pattern for each imaging parameter, or may represent a mathematical model that receives the imaging parameter as input and outputs the artifact pattern. As a result, the artifact distribution corresponding to the imaging parameter is estimated.

The imaging parameter associated with the artifact pattern may include at least a parameter related to the exposure of the camera 28. More specifically, the f-number or the effective aperture of the stop 28d need only be included. In general, as the effective aperture of the stop 28d is smaller, the diffraction of the incident light into the optical system of the camera 28 is more remarkable, so that the artifact is likely to be remarkable. Therefore, most of the variations in the artifact pattern are explained by the change in the f-number or the effective aperture of the stop 28d.

In addition, the artifact pattern may include a distortion caused by the objective lens 281 constituting the optical system of the camera 28. The distortion is a phenomenon in which an image appearing in a peripheral portion of the screen area is more diffused in the peripheral portion than in a center portion of the screen area. The distortion is represented by a displacement of the artifact pattern with respect to the pixel for each pixel.

Therefore, the artifact distribution estimation unit 106 may be set with the artifact pattern data indicating the relationship with the artifact pattern for each set of the imaging parameter and the pixel (coordinate). The artifact distribution estimation unit 106 can determine the artifact pattern data corresponding to the imaging pattern acquired from the imaging control unit 102 for each pixel belonging to the bright portion with reference to the set artifact pattern data.

As described above, the information processing apparatus 10 according to one or more embodiments includes the display 14 in which the plurality of pixels are arranged, the camera 28, and the controller (for example, the host system 100). The light transmitted through a part of an area of the display 14 is incident on the camera 28. The controller determines a high-brightness area (for example, the light source area) in which the brightness exceeds a certain value based on the brightness distribution of the captured image captured by the camera 28, determines the artifact distribution around the light source area based on the artifact pattern for the point light source, estimates the correction image based on the captured image by using the machine learning model that has learned the relationship between the first image captured with the transmission through the display 14 and the second image captured without the transmission through the display 14, determines the applied intensity of the correction image based on the artifact distribution, and combines the correction image and the captured image based on the determined applied intensity. In addition, the camera 28 may be installed on the back surface of the display surface of the display 14.

With this configuration, the correction image corresponding to the captured image is estimated by using the machine learning model, the high-brightness area is determined based on the brightness distribution of the captured image, and the correction image and the captured image are combined based on the applied intensity determined based on the artifact distribution determined based on the artifact pattern and the high-brightness area. The combined output image includes the component of the correction image with a weight corresponding to the artifact distribution around the light source area. A remarkable artifact in the vicinity of the light source area is suppressed, and the variation in the luminance or the hue in the correction image in an area farther away is suppressed. Therefore, it is possible to obtain the output image having a higher image quality than the correction image.

In addition, the controller may determine the specific area representing the specific object from the captured image, and apply the captured image in the determined specific area without applying the correction image.

With this configuration, the image of the specific object appears in the captured image without including the component of the correction image in which the luminance or the hue in the specific area varies. It is possible to avoid giving the user an abnormal impression of the specific object.

In addition, the controller may determine the artifact pattern depending on the imaging parameter of the camera 28. The imaging parameter may include the parameter related to the exposure of the camera 28.

With this configuration, the artifact distribution is determined based on the artifact pattern depending on the imaging parameter. Therefore, in a case in which the imaging parameter is adjusted depending on the imaging environment within the field of view of the camera 28, the artifact distribution is more accurately estimated. By combining the correction image and the captured image by using the applied intensity based on the estimated artifact distribution, it is possible to obtain the output image having a higher image quality.

In addition, the imaging parameter may include the parameter related to the exposure of the camera 28. The artifact pattern is adjusted based on the parameter related to the exposure of the camera 28, which is a main factor of the dependency of the artifact pattern. Even in a case in which the number of parameters related to the adjustment of the artifact pattern is reduced, the artifact distribution is more accurately estimated, so that an amount of processing in the adjustment of the artifact pattern can be reduced while suppressing the deterioration of the image quality.

Although the embodiments of the present invention have been described in detail with reference to the drawings, the specific configurations are not limited to the above-described embodiments, and the present invention includes designs and the like within a scope not departing from the spirit of the present invention. The configurations described in the above-described embodiments can be optionally combined.

DESCRIPTION OF SYMBOLS 10 information processing apparatus
10a first chassis
10b second chassis
11 processor
12 main memory
13 video subsystem
14 display
14b substrate
14p pixel
21 chip set
22 ROM
23 auxiliary storage device
24 audio system
25 communication module
26 input/output interface
28 camera
28af automatic focusing mechanism
28ct camera controller
28d stop
28is imaging element
281 objective lens
28of optical filter
28s shutter
31 EC
32 input device
33 power supply circuit
34 battery
100 host system
102 imaging control unit
104 light source area estimation unit
106 artifact distribution estimation unit
107 keyboard
108 correction image estimation unit
109 touch pad
110 specific area estimation unit
112 applied intensity setting unit
114 image combining unit
116 output processing unit
120 storage unit
121a, 121b hinge mechanism
ax rotation axis
NA normal area
TA transmission area
SA screen area

What is claimed is:

1. An electronic apparatus comprising:
a display in which a plurality of pixels are arranged;
a camera; and
a controller,
wherein light transmitted through a part of an area of the display is incident on the camera, and
the controller is configured to
determine a high-brightness area in which a brightness exceeds a certain value, based on a brightness distribution of a captured image captured by the camera,
determine an artifact distribution based on an artifact pattern for a point light source and the high-brightness area,
estimate a correction image based on the captured image by using a machine learning model that has learned a relationship between a first image captured with transmission through the display and a second image captured without transmission through the display,
determine an applied intensity of the correction image based on the artifact distribution, and
combine the correction image and the captured image based on the applied intensity.

2. The electronic apparatus according to claim 1,
wherein the controller is configured to
determine a specific area representing a specific object from the captured image, and
apply the captured image in the specific area without applying the correction image.

3. The electronic apparatus according to claim 1,
wherein the controller is configured to determine the artifact pattern depending on an imaging parameter of the camera.

4. The electronic apparatus according to claim 3,
wherein the imaging parameter includes a parameter related to exposure of the camera.

5. The electronic apparatus according to claim 1,
wherein the camera is installed on a back surface of a display surface of the display.

6. An image processing method of an electronic apparatus including a display in which a plurality of pixels are arranged, and a camera, in which light transmitted through a part of an area of the display is incident on the camera, the image processing method comprising:
via the electronic apparatus,
determining a high-brightness area in which a brightness exceeds a certain value, based on a brightness distribution of a captured image captured by the camera;
determining an artifact distribution based on an artifact pattern for a point light source and the high-brightness area;
estimating a correction image based on the captured image by using a machine learning model that has learned a relationship between a first image captured with transmission through the display and a second image captured without transmission through the display;
determining an applied intensity of the correction image based on the artifact distribution; and
combining the correction image and the captured image based on the applied intensity.

* * * * *